United States Patent

[11] 3,600,079

| [72] | Inventors | Luke J. Smith, Jr.<br>East Longmeadow;<br>Alvin R. Pottern, Longmeadow, both of, Mass. |
|---|---|---|
| [21] | Appl. No. | 825,697 |
| [22] | Filed | May 19, 1969 |
| [45] | Patented | Aug. 17, 1971 |
| [73] | Assignee | Milton Bradley Company<br>Springfield, Mass. |

[54] TRANSPARENCY HOLDER AND VIEWING DEVICE
1 Claim, 7 Drawing Figs.

[52] U.S. Cl. ................................................... 353/120
[51] Int. Cl. .................................................... G03b 21/00
[50] Field of Search.............................................. 353/120, 122; 402/70, 71, 73, 75; 40/102, 135, 150, 106.1

[56] References Cited
UNITED STATES PATENTS

| 1,507,547 | 9/1924 | Grunewald | 402/71 |
| 2,779,116 | 1/1957 | Smith | 40/106.1 |
| 2,962,825 | 12/1960 | Bravo | 40/106.1 |
| 3,253,358 | 5/1966 | Wright | 40/106.1 |
| 3,264,767 | 8/1966 | Coffman | 353/120 |
| 3,264,936 | 8/1966 | Schultz | 353/120 |
| 3,387,395 | 6/1968 | Merritt | 40/102 |
| 3,438,702 | 4/1969 | Milhaupt | 40/106.1 |

Primary Examiner—Leonard Forman
Assistant Examiner—A. J. Mirabito
Attorneys—Kenwood Ross and Chester E. Flavin ABSTRACT: The combination with a projector for displaying transparencies of a device for the storage, selection and display of transparencies contained therein and comprising, a traylike container for the transparencies and having an open end, a cover adapted to enclose the container when the device is not in viewing use and adapted to support the container relative to the projector when the device is in viewing use, and guide means in the form of one of more wire rods for guiding the transparencies between stored and ready-to-view positions within the container and viewing positions on the projector.

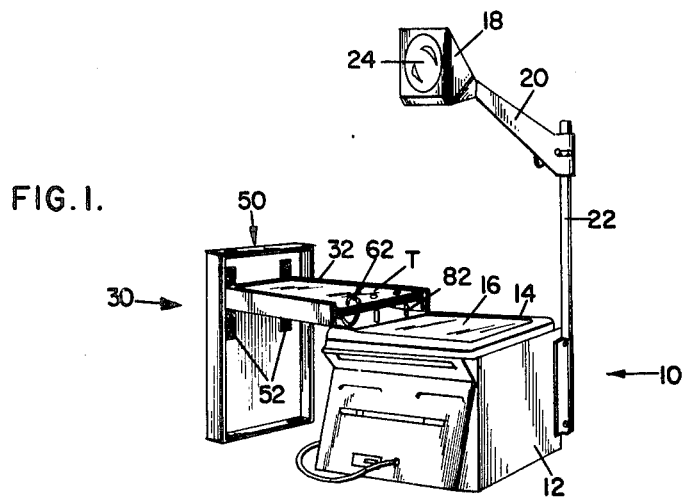
FIG. 1.
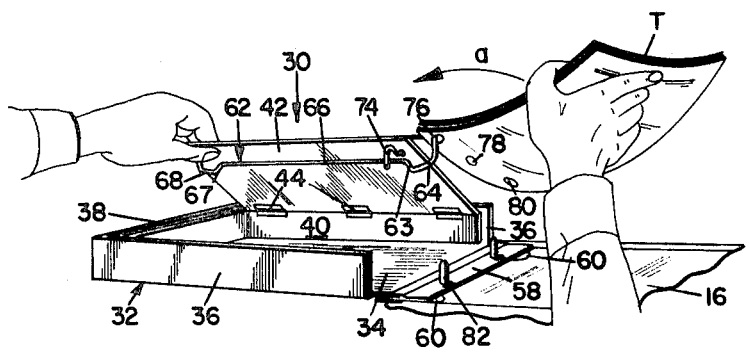
FIG. 2.
FIG. 3.
INVENTOR.
LUKE J. SMITH, JR.
ALVIN R. POTTERN
BY *Kenwood Ross &
Chester E. Flavin*
ATTORNEYS.

PATENTED AUG 17 1971 3,600,079

INVENTOR.
LUKE J. SMITH, JR.
ALVIN R. POTTERN
BY
Kenwood Ross &
Chester E. Flavin
ATTORNEYS.

3,600,079

TRANSPARENCY HOLDER AND VIEWING DEVICE

BACKGROUND OF THE INVENTION

1. Field of the Invention

Transparency storage and display equipment for use in conjunction with light boxes and overhead projectors.

2. Description of the Prior Art

It has been known to bind transparencies in a multiple-hinged book for display relative to overhead projectors. However same have been expensive to manufacture and complicated in their use. Other devices require bulky secondary support platforms, masks and means for registering or positioning transparencies in viewing position.

SUMMARY OF THE INVENTION

A primary object of the invention is to provide a simple, compact, self-contained and inexpensive device for storing transparencies and permitting their orderly display relative to an overhead projector or light box, while eliminating the need for secondary support and storage trays or guiding means and the like.

BRIEF DESCRIPTION OF THE DRAWING

FIG. 1 is a perspective view showing a transparency holder and viewing device embodying a preferred form of the invention, same being mounted relative to, and ready for use in conjunction with a conventional overhead projector;

FIG. 2 is a fragmentary perspective view of the device showing the manner in which transparencies are moved from nonoperative position to operative position preparatory to movement into viewing position;

FIG. 3 is a fragmentary perspective view of the device showing the manner in which transparencies are moved from operative position to viewing position;

DESCRIPTION OF THE PREFERRED EMBODIMENT

Figure 4:
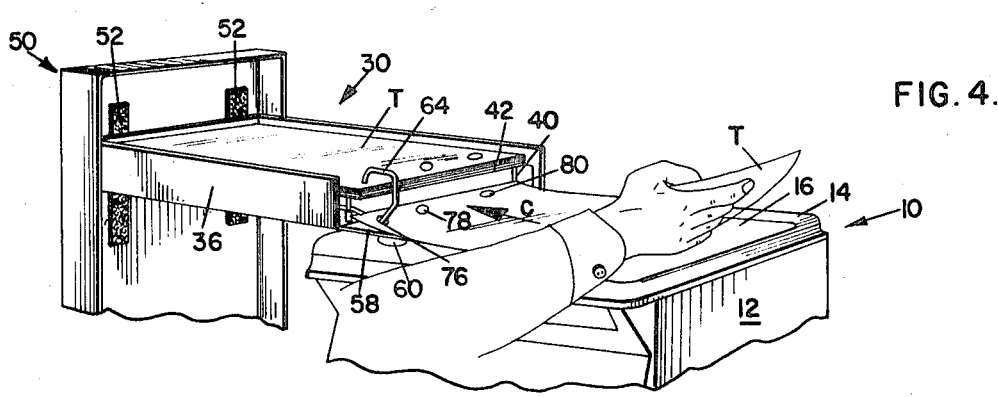
FIG. 4 is a fragmentary perspective view of the device showing the manner in which transparencies are moved from viewing position to nonoperative or stored position.

The device of the invention is used in combination with a conventional light box or overhead projector of the type shown in FIG. 1, generally indicated by 10, and comprising an enclosure 12 housing the usual light source, lenses and mirror, not shown, having an upper support table 14 which includes a transparent portion 16 of glass or clear plastic. Light is projected through the transparent portion to a housing 18 held by an arm 20 relative to a support rod 22 upwardly of enclosure 12; the housing contains a mirror, not shown, which directs the light through a lens 24 onto a viewing screen, also not shown.

Thus, when a transparency is placed upon transparent portion 16 of enclosure 12, any images contained thereon will be projected onto the screen.

The present invention pertains to accurate presentation and proper storage and to display of transparencies or packs of transparencies in packet form relative to such a projector. While it is one of the advantages of the present device that it is usable with most projectors of the type indicated, it will be understood that there is nothing herein to preclude use of the disclosed device with other types of projectors.

The device of the invention, which is generally indicated by 30, serves the twofold purposes of storing transparencies in a protected, orderly manner when not in use, and of permitting such transparencies to be displayed, in desired order, and quickly and easily, on an overhead projector of the type described.

The device includes a traylike container 32 for storage and support of a plurality of transparencies T, the container comprising a base wall 34, upright sidewalls 36 and one end wall 38, the opposite end being open, for purposes to be described. A ridge wall 40 provided on the inwardly facing surfaces of walls 36 and 38 supports a platform 42 upwardly of base wall 34, the platform being hinged along one edge to the ridge wall as by hinges 44 so that it can be readily swung upwardly to provide access to the interior of the container.

The transparencies are normally stored below platform 42 when not in use and are supported by the platform when ready for use with an overhead projector, as will appear.

A combination cover and support member 50 is provided for enclosing container 32 when the device is not in use and for supporting the container relative to an overhead projector when the device is in use.

Cover and support member 50 carries a pair of VELCRO strips 52 on the inner surface of its upper wall and container 32 carries a pair of VELCRO patches 54 on the outer surface of end wall 38, VELCRO being the trademark for a commercially available product described in U.S. Pat. No. 2,717,437 to de Mestral and comprising a plurality of NYLON hooks releasably engageable with a plurality of NYLON loops.

By this novel fastening means, when one end of container 32 is rested upon support table 14 of the overhead projector, and cover member 50 is stood on its end adjacent the projector in the manner shown in the drawing, the opposite free end of the container may be quickly, easily and releasably secured to cover 50 by engaging the VELCRO patches 54 with the VELCRO strips 52, whereby the container is securely supported relative to the projector.

Of course, any suitable releasable fastening means may be employed in lieu of that disclosed.

Rubber bumpers or feet 56, (see FIG. 6), may optionally be provided on the lower end wall of cover 50 to preclude marring or slipping.

The open end of the container, or that end which rests upon the support table of the projector, is provided with a lip 58 which is preferably removably attached to the container and which extends outwardly from base wall 34 of the container so as to overlie and rest upon the support table immediately adjacent transparent portion 16 of the projector.

Soft, resilient rubber feet or suction cups 60 provided on the lower surface of lip 58 securely anchor the inner end of the container relative to the projector.

With the cover supporting the container relative to the projector in the manner described, the stage is set for the display of the transparencies.

The transparencies usually comprise a set or packet pertaining to a particular subject and are arranged in the order in which the several phases or subdivisions of the subject are to be presented.

Figure 6:
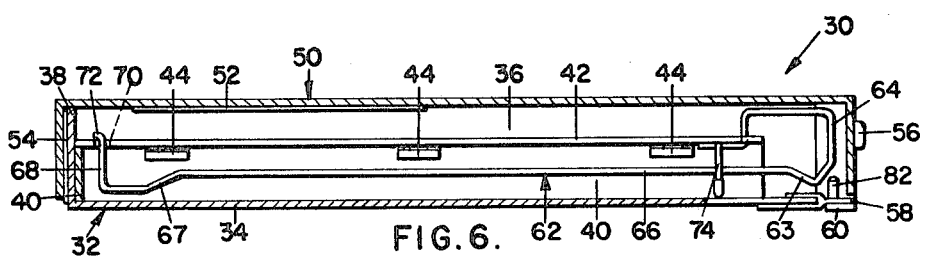
FIG. 6 is a longitudinal cross-sectional view taken through a transparency holder and viewing device embodying the invention, showing the cover portion assembled on the container portion for storage of the device.
Figure 7:
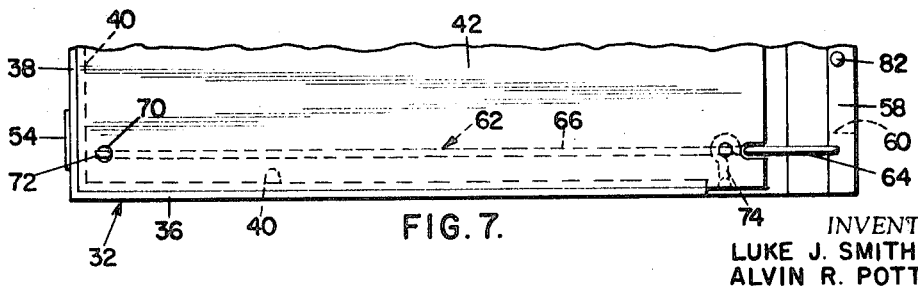
FIG. 7 is a fragmentary top plan view of a portion of the container and certain component parts thereof.

This set or packet of transparencies is releasably, slideably and hingedly attached to a guide 62, best seen in FIG. 6, provided on platform 42 immediately adjacent and parallel to one sidewall 36 of container 32.

Guide 62, which is preferably formed from thin-gauge wire so that it can be easily shaped and deformed, is fixed at one end adjacent the open or lip end of the container to the platform, extends outwardly from the platform to form a hinge 64 in the form of a modified loop and has a lower reach 66 which extends rearwardly from the hinge below and in spaced relation to the platform, and has an opposite upturned inner free end 68 which passes freely through a provided opening 70 in platform 42, the free end being offset as at 72 to provide a slight lip for engaging the upper side of the platform.

While not shown in the drawings, a pair of guides 62 may be optionally employed, one adjacent each sidewall 36 of container 32, although one such guide is normally sufficient.

A depending leg 74 may be provided at the opposite end of the guide adjacent hinge 64 to form a support for the forward end of the platform. This leg is conveniently but not necessarily formed as an integral part of the guide.

As best seen in FIG. 6, guide 62 is preferably, but not necessarily, deformed at its opposite ends, at 63, at its forward end, adjacent hinge 64 and at 67, at its rearward end, adjacent free end 68, with the deformed portions being disposed below the plane of the lower reach 66 of the guide.

The angle or inclined plane formed by forward deformed portion 63 serves to raise the edge of each transparency as it is inserted into the container below platform 42 so that is clears the transparencies already stored.

The angle or inclined plane formed by rearward deformed portion 67 provides for clearance when stacking and facilitates the sliding of the transparencies along the guide.

Transparencies may be interleaved with cards on the guide to provide printed instructions or for indexing purposes.

The adjacent sidewall 36 of the container is preferably cut away adjacent hinge 64 to provide ready access to the hinge and platform and to provide the clearance necessary for temporary removal of a transparency from viewing position.

The transparencies are provided with a trio of spaced openings adjacent the leading edges thereof. One of these openings is a slot 76 adjacent one corner of each transparency through which guide 62 may pass.

The other openings comprise an aperture 78 and slot 80 in which a pair of upstanding registration pins 82 on lip 58 of the container are receivable.

To mount a transparency on guide 62, platform 42 is raised in the manner of FIG. 2, and free end 68 of the guide is removed from its engagement in platform opening 70 by pressing inwardly and downwardly on said free end.

The free end of the guide is then passed through slot 76 at the corner of the transparency and reengaged in platform opening 70.

The transparency is now mounted on the lower reach 66 of the guide and is disposed below platform 42. If the unit is to be stored, the transparency can be left in that position.

If the unit is to be used, the transparency must be moved from its stored position below the platform to a ready-to-use position wherein it is resting on the platform.

This is easily accomplished by raising the platform, grasping the transparency adjacent the open lip end of the container, pulling it forwardly so that is slides along the lower reach of the guide and then rotating it relative to hinge 64 in the manner shown in FIG. 2 in the direction of the arrow *a* so that it now rests upon the platform in a face-down position as shown in FIG. 3.

The transparency is now ready to be moved into viewing position on transparent portion 16 of viewing table 14 by rotating it relative to hinge 64 of guide 62 in the direction of arrow *b* in FIG. 3 and bringing it to rest in faceup position on transparent portion 16, with registration pins 82 passing through aperture 78 and slot 80 in the transparency.

The transparency may be returned to ready-to-use position on the platform by removing it from engagement with the registration pins and rotating it relative to hinge 64.

To return the transparency from the viewing area to a stored position below the platform, the transparency is raised so that registration pins 82 are removed from engagement in aperture 78 and slot 80 and then the transparency is pushed inwardly through the open end of the container in the direction of arrow *c* in FIG. 4 along the lower reach 66 of guide 62 until its entire length is housed within the container.

Figure 5:
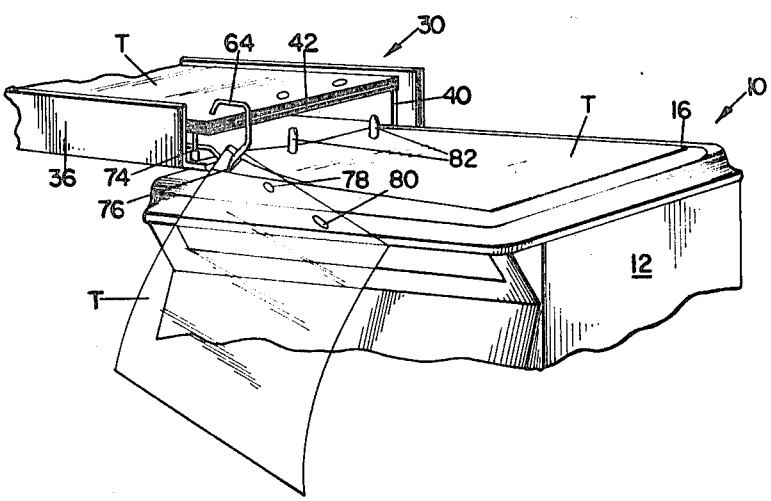
FIG. 5 is a fragmentary perspective view showing the manner in which a transparency may be temporarily removed from viewing position.

Should it be desired to temporarily remove one transparency from the viewing area rather than returning it to a stored position, the transparency is moved to the position shown in FIG. 5 wherein it is suspended at slot 76 from hinge 64 of the guide to the front of the projector whereby one or more transparencies may be placed on the transparent portion and then removed therefrom and the transparency which was temporarily removed may be returned to viewing position. Of course, this feature is not available where two guides are employed.

Transparencies may be quickly and easily moved between stored position, ready to use position and viewing position by sliding them along and relative to guide 62.

Groups or packs of transparencies arranged by subject are placed on and removed from the guide with facility and in any desired sequence.

The device per se is self contained, compact and sturdy, may be set up and dismantled with ease, and serves as a convenient storage means to protect the transparencies and maintain them in the desired order.

To dismantle the device, all transparencies may be removed from the viewing area and placed in a stored position below the platform or left in ready to use position on the platform; cover 50 is removed from its engagement with container 32 by separating the VELCRO strips and patches, the lip end of the container is raised from the projector and the cover is placed over the container.

We claim:

1. The combination with a projector for displaying transparencies of a device for the storage, selection and display of transparencies of a device for the storage, selection and display of transparencies contained therein and comprising, a traylike container for the transparencies and having an open end, a base wall, a closed wall opposite said open end and two upright sidewalls parallel to each other on opposite sides of said base wall and extending from said closed end wall to said open end, a cover which encloses the container when the device is not in viewing use and which supports the container relative to the projector when the device is in viewing use, raised platform parallel to the base wall and with an edge substantially coextensive with one of said sidewalls and an edge adjacent the open end within the container with the space between the platform and the base of the container serving as an optional storage space for transparencies, guide means for guiding the transparencies comprising a wire rod releasably fixed to the platform and extending along a side edge thereof parallel to one upright sidewall, the guide means having a lower reach disposed in spaced parallelism to and below the platform and including a looplike hinge adjacent the open end and extending beyond the edge of the platform adjacent the open end of the container integral with the lower reach and extending upwardly therefrom to a position above the platform, the transparencies being movable along and relative to the lower reach and around the looplike hinge between a position below the platform and a position wherein they are resting on the platform, and being further movable relative to the looplike hinge between said position wherein they are resting on the platform and a viewing position on the projector.